UNITED STATES PATENT OFFICE.

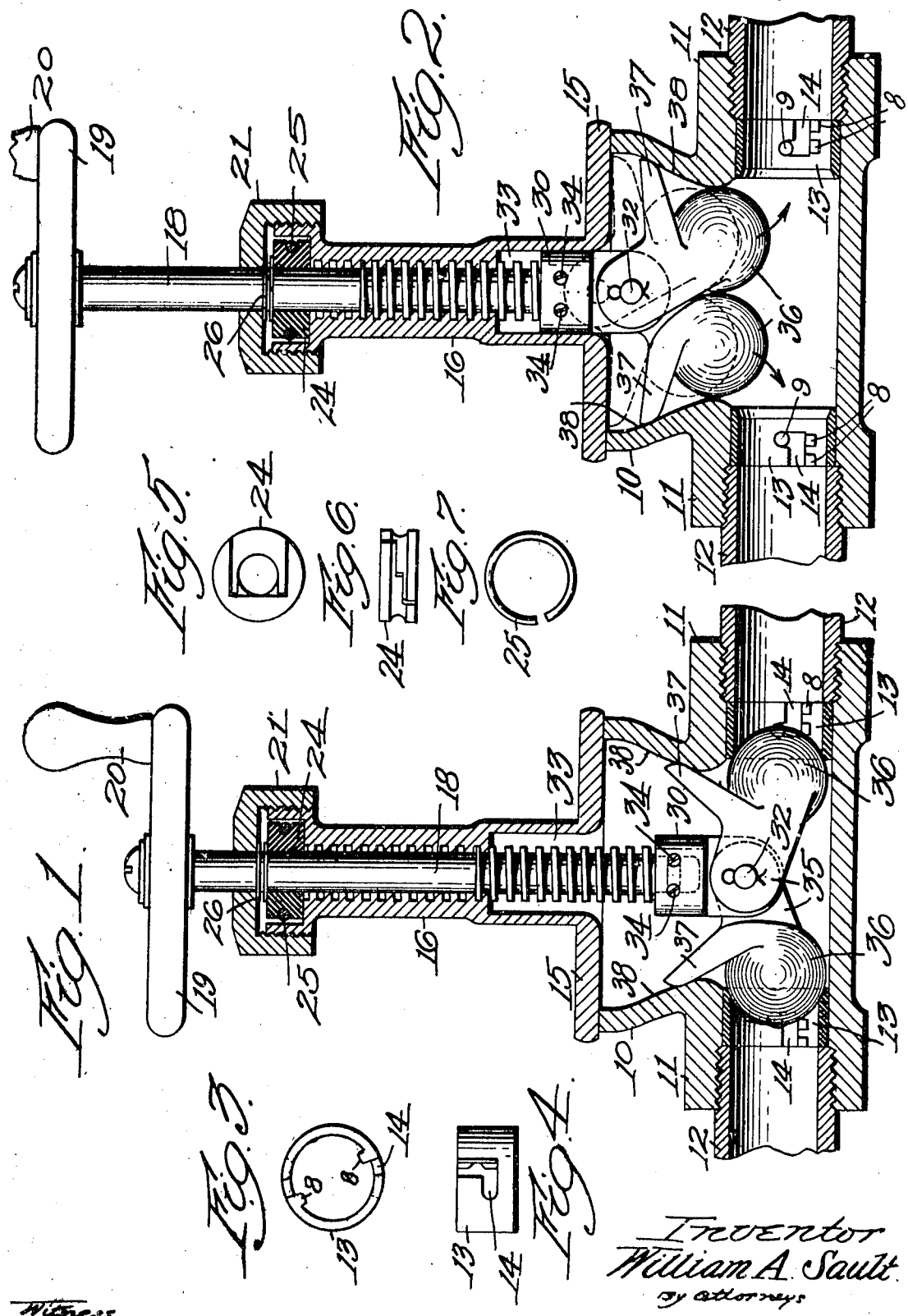

WILLIAM A. SAULT, OF WORCESTER, MASSACHUSETTS.

STRAIGHTWAY DOUBLE-ACTING VALVE.

1,314,609. Specification of Letters Patent. Patented Sept. 2, 1919.

Application filed August 16, 1918. Serial No. 250,219.

*To all whom it may concern:*

Be it known that I, WILLIAM A. SAULT, a citizen of the United States, residing at Worcester, in the county of Worcester and State of Massachusetts, have invented a new and useful Straightway Double-Acting Valve, of which the following is a specification.

This invention relates to a valve adapted for use for steam and other fluids of the double-acting straight-way type.

The principal objects of the invention are to provide a double-acting valve of such construction that there will be practically no sediment or clogging and therefore no friction, and to secure a relatively great leverage for closing the valves; to provide means whereby the valves when open will be drawn to one side out of the path of the fluid; to provide means whereby when they are being moved toward the seats they will move apart by a cam motion before they are in alinement with their seats; to provide a construction in which the valves will have a better chance of closing tight than is usually the case by giving them a spherical shape and seating them in cup seats having ground spherical seating surfaces; to provide a sliding piston packing ring in two parts held tight to the spindle which plays up and down between them for preventing the escape of the fluid; to provide an improved removable cup seat; and other features as will appear hereinafter.

Reference is to be had to the accompanying drawings, in which—

Figure 1 is a longitudinal central sectional view of a double-acting straight-way steam valve constructed in accordance with this invention showing the valve closed;

Fig. 2 is a similar view showing the valve partially open;

Fig. 3 is an end view of the removable cup valve seat;

Fig. 4 is a side view thereof;

Fig. 5 is a plan of the sliding piston packing ring enlarged;

Fig. 6 is an edge view thereof, and

Fig. 7 is a plan of the spring for operating it.

The invention is illustrated in a form in which it involves a valve casing 10 having two opposite heads 11 for receiving the steam pipes 12 for conducting steam to and from it. In each of these heads is a removable seat 13 having a flaring seat of cup shape with a seating surface of spherical form, for a spherical valve 36 which seats itself tight, constituting in effect, a ground joint. This seat has a double bayonet joint 14 for holding it detachably in place, coöperating with two opposite pins 9 in the valve body. The seat or ring is inserted and then turned in one direction to lock it. Two lugs 8 are shown to coöperate with a wrench for locking it and unlocking it.

The casing is provided with a bonnet 15 having a tubular part 16 extending up from it and screw-threaded inside part way up to receive a screw threaded valve stem 18. This is provided with a hand-wheel 19 having a handle 20 for facilitating its quick operation. This tube 16 is closed by a nut 21 as usual. Inside a chamber in an enlargement of the tube 16 at the top is a sliding automatic piston valve stem packing ring 24. This consists of two similar halves fitting together and having a surrounding nearly circular spring 25 in an external groove around them to hold the two parts tight on the spindle 18 which plays up and down between them. The two parts of the ring are shown with three steps to prevent escape of steam or water. A coil spring 26 above the ring 24 forces it down against its seat and makes it take up all wear. This prevents leaking without the use of the troublesome forms of soft packing usually employed.

At the bottom of the valve stem is a head 30 which fits into a stem socket 33 countersunk in the inner face of the bonnet. This head fits tight in the bottom of its seat when the stem is raised and the valve open. Thus the escape of water or steam is prevented here and also at the top of the stem. Two screws 34 pass through the top of this head into opposite sides of a groove and hold the head on the valve stem. They prevent it from rocking but allow it to turn. The head supports a removable headed pivot pin 32 pivotally connecting two stems 35 each fixed on one of a pair of valves 36. A cotter pin is shown for holding the pin so that it can be removed readily. These valves are of spherical shape or at least their active surfaces are spherical, and each one is provided with an arm 37 for assisting in guiding it by cam action by the surfaces 38 on the inside of the valve casing 10. These curved cam surfaces time the motion of the valves so that they seat accurately.

In the operation of the device if the screw is turned upwardly to its limiting position above that shown in Fig. 2, the ring 24 is pressed firmly to its seat to prevent leakage. At the same time the two valves are in contact with the lower end of the surfaces 38 and in contact with each other, the length of the valve casing being substantially equal to the sum of the diameter of the two valves. Upon lowering the screw the parts pass down to the position shown in Fig. 2, in which the ends of the arms 37 engage the surfaces 38 and the arms are held back so that the valves are obliged to start to swing outwardly about their common pivot 32 away from each other. This action occurs before they really come into co-active relation with their valve seats. Then upon moving the screw down farther the valves will come into their seats and the final pressure to close them is secured by what is really a toggle joint connection, namely, the forcing down of the pin 32 at the ends of the two arms 35 which are pivoted together by it. In their final closed position, of course, the arms 35 are left at an angle to the horizontal so as to permit of any adjustment that may be desired of the valve seats 13. This provides for insuring the seating of the valves and gives the best kind of leverage for forcing them firmly to their seats each one working against the other so that there is no danger of their becoming unseated by the pressure when once they have been brought firmly to seating position.

As the valves are closing they are always forced apart by the action of the arms along the cam surfaces. The valves do not touch the bottom of the valve casing at any time during their closing movement.

Although I have illustrated and described only a single form of the invention I am aware of the fact that many modifications can be made therein by any person skilled in the art without departing from the scope of the invention as expressed in the claims. Therefore, I do not wish to be limited to all the details herein shown and described, but what I do claim is:—

1. In a double-acting valve, the combination with a valve casing having two spherical valve seats, of a screw, two spherical valves pivotally connected with said screw, and supported entirely thereby, and means for swinging said valves apart as the screw moves them toward their seats.

2. In a double-acting straight-way valve the combination with a valve casing having two opposite spherical valve-seats, of a screw arranged transverse to the direction of flow between said seats, two spherical valves supported by said screw and capable of moving relatively thereto, means in the valve casing for guiding the valves to move parallel with each other for a distance as the screw is turned inwardly until they engage said valve-seats, and means whereby the further rotation of the screw inwardly acts to cause them to be forced apart and firmly seated on their seats.

3. In a valve, the combination with a valve casing having two valve seats and a chamber, of a screw, two valves for said seats, a toggle connection between said screw and valves, said chamber being large enough to receive said valves when retracted and in contact with each other, said casing having surfaces for engaging said valves and swinging them apart as they are moved away by said screw from their fully retracted position in said chamber.

4. In a straight-way double-acting valve, the combination with a valve casing having two valve seats and a chamber above the level of said seats, of a screw, two valves for said seats pivoted together and pivotally connected with said screw, said chamber being located, and large enough, to receive said valves when retracted and in contact with each other, and a projection connected with each valve, said casing having opposite cam surfaces for engaging said projections, and controlling the pivotal motion of said valves throughout the period when they are being moved away from their fully retracted position in said chamber by said screw.

5. In a valve, the combination with a valve casing having a valve seat and a chamber at one side thereof, of a screw movable through said chamber, a valve for said seat pivotally connected with said screw, said valve having a projection extending therefrom in said chamber, and the casing having a surface for engaging said projection and guiding it and the valve as the screw moves inwardly to bring the valve into engagement with the seat, and means whereby as the screw moves further the valve will be seated positively thereby.

6. In a device of the class described, the combination with a tubular member having a circumferential chamber at one end thereof, of a stem movable in said tubular member and through said chamber, and a packing ring located in the chamber and consisting of two members slidable on each other, each of said members having a plurality of plane parallel surfaces along which it engages the other member, and one member having beyond said surface at one side a guiding projection adapted to slide with respect to the other member which is provided with a depression in its end surface for receiving it.

In testimony whereof I have hereunto affixed my signature.

WILLIAM A. SAULT.